United States Patent
Huang et al.

(10) Patent No.: US 7,538,993 B2
(45) Date of Patent: May 26, 2009

(54) RECEPTACLE CIRCUIT INTERRUPTING DEVICES PROVIDING AN END OF LIFE TEST CONTROLLED BY TEST BUTTON

(75) Inventors: Huadao Huang, c/o Shanghai Meihao Electric Inc., - No. 58 Shahe Road Jiangqiao Town, Jiading Borough, Shanghai (CN); Lu Huayang, Shanghai (CN)

(73) Assignee: Huadao Huang, Shanghai (CN)

( * ) Notice: Subject to any disclaimer, the term of this patent is extended or adjusted under 35 U.S.C. 154(b) by 452 days.

(21) Appl. No.: 11/585,170

(22) Filed: Oct. 24, 2006

(65) Prior Publication Data

US 2007/0041134 A1   Feb. 22, 2007

Related U.S. Application Data

(63) Continuation-in-part of application No. 11/362,039, filed on Feb. 27, 2006, now Pat. No. 7,315,227.

(60) Provisional application No. 60/656,090, filed on Feb. 25, 2005.

(51) Int. Cl.
H02H 3/00 (2006.01)
(52) U.S. Cl. .............................. 361/42; 335/18; 361/45
(58) Field of Classification Search .................. 335/6, 335/18; 361/42–50
See application file for complete search history.

(56) References Cited

U.S. PATENT DOCUMENTS

| | | | |
|---|---|---|---|
| 4,386,338 A | 5/1983 | Doyle et al. | |
| 4,518,945 A | 5/1985 | Doyle et al. | |
| 4,595,894 A | 6/1986 | Doyle et al. | |
| 5,202,662 A | 4/1993 | Bienwald et al. | |
| 5,654,857 A | 8/1997 | Gershen | |
| 5,680,287 A | 10/1997 | Gernhard et al. | |
| 5,963,408 A | 10/1999 | Neiger et al. | |
| 6,040,967 A | 3/2000 | DiSalvo | |
| 6,052,265 A | 4/2000 | Zaretsky et al. | |
| 6,111,733 A | 8/2000 | Neiger et al. | |
| 6,226,161 B1 | 5/2001 | Neiger et al. | |
| 6,246,558 B1 | 6/2001 | DiSalvo et al. | |
| 6,252,407 B1 | 6/2001 | Gershen | |

(Continued)

Primary Examiner—Ramon M Barrera
(74) Attorney, Agent, or Firm—Fei-Fei Chao; Andrews Kurth LLP

(57) ABSTRACT

The present invention provides a circuit interrupting device which can test the conditions of the components in the circuit interrupting device (i.e., the end-of-life test) through the depression of a test button. The circuit interrupting device also possesses reverse wiring protection, including the ability to cutoff power on the user accessible plugs of the face plate when the device is reverse wired or miswired. The circuit interrupting device contains a test button, a reset button, and a series of circuits (including, but not limited to, a main control circuit, an end-of-life detection circuit, and a reset/trip circuit). A depression of the test button generates a simulated fault, which is detected by the main control circuit. When the components in the main control circuit work properly, a control signal is generated by the main control circuit and transmitted to the end-of-life detection circuit to activate the reset/trip circuit and generated an indication signal. After the indication signal is displayed, the reset button is able to be depressed, which sends a signal to the end-of-life detection circuit, which in turn forwards the signal to the reset/trip circuit to reestablish the electrical continuity of the circuit interrupting device.

29 Claims, 10 Drawing Sheets

U.S. PATENT DOCUMENTS

| | | |
|---|---|---|
| 6,282,070 B1 | 8/2001 | Ziegler et al. |
| 6,288,882 B1 | 9/2001 | DiSalvo et al. |
| 6,309,248 B1 | 10/2001 | King |
| 6,381,112 B1 | 4/2002 | DiSalvo |
| 6,437,953 B2 | 8/2002 | DiSalvo et al. |
| 6,469,881 B2 | 10/2002 | Gershen et al. |
| 6,580,344 B2 | 6/2003 | Li |
| 6,671,145 B2 | 12/2003 | Germain et al. |
| 6,963,260 B2 | 11/2005 | Germain et al. |
| 7,009,473 B2 | 3/2006 | Zhang et al. |
| 7,019,952 B2 | 3/2006 | Huang et al. |
| 7,049,910 B2 | 5/2006 | Campolo et al. |
| 7,049,911 B2 | 5/2006 | Germain et al. |

RECEPTACLE CIRCUIT INTERRUPTING DEVICES PROVIDING AN END OF LIFE TEST CONTROLLED BY TEST BUTTON

RELATED APPLICATIONS

The present application is a Continuation-In-Part (CIP) of U.S. patent application Ser. No. 11/362,039, filed on Feb. 27, 2006 now U.S. Pat. No. 7,315,227, which claims the priority of U.S. Provisional Patent Application Ser. No. 60/656,090, filed on Feb. 25, 2005, which are herein incorporated by reference.

FIELD OF THE INVENTION

The present invention relates to a circuit interrupting device which is capable of testing the conditions of the components in the circuit interrupting device (i.e., the end-of-life test) upon a depression of a test button. The circuit interrupting device also possesses a reverse wiring protection, including the ability to cutoff power on the user accessible plugs of the face plate when the device is reverse wired or miswired. The circuit interrupting device contains a test button, a reset button, and a series of circuits (including, but not limited to, a main control circuit, an end-of-life detection circuit, and a reset/trip circuit). A depression of the test button generates a simulated fault, which is detected by the main control circuit. When the components in the main control circuit work properly, a control signal is generated by the main control circuit and transmitted to the end-of-life detection circuit to activate the reset/trip circuit and generated an indication signal. After the indication signal is displayed, the reset button is able to be depressed, which sends a signal to the end-of-life detection circuit, which in turn forwards the signal to the reset/trip circuit to reestablish the electrical continuity of the circuit interrupting device.

BACKGROUND OF THE INVENTION

Circuit interrupting devices, such as ground fault circuit interrupters ("GFCIs"), arc fault circuit interrupters ("AFCIs"), and circuit breakers, have been widely used by consumers since 1970s. Nowadays, due to household safety concerns, there are needs for GFCIs with extra safety features. According to new UL standards under 943A which was implemented on Jul. 28, 2006, a GFCI is required not only to have reverse wiring protection, but also to be able to provide a user with indications when the GFCI has reached the end of its service life and is no longer capable of providing ground fault protection, and cutoff electricity on the user accessible plug of the GFCI. That is because for most of the GFCIs currently available on the market, when their service life ends, resetting by pressing the reset button is still possible, which gives the users a false sense of security that they are still under proper protection of the GFCI, while in fact the GFCIs' capability of sensing a ground fault and cutting off the electricity due to a ground fault has been compromised. Thus, when a ground fault occurs, the GFCI is unable to provide any protection, which can result in fatal electric shocks.

SUMMARY OF THE INVENTION

The present invention provides a circuit interrupting device, such as a ground fault circuit interrupter, an arc fault circuit interrupter, an immersion detection circuit interrupter, an appliance leakage circuit interrupter, or a circuit breaker. The circuit interrupting device contains a test button; a series of circuits including a main control circuit, an end-of-life detection circuit, and a reset/trip circuit; and a reset button. When the circuit interrupting device is properly wired with power on and at a tripped state, a depression of the test button generates a simulated fault which can be detected by the main control circuit. When the components in the main control circuit work properly, a control signal is generated by the main control circuit and transmitted to the end-of-life detection circuit to activate the reset/trip circuit, which in turn can generate an indication signal. The preferred indication signal is a sound, such as a clatter sound "da". A depression of the test button also can perform a reverse wiring test, i.e., if the circuit interrupting device is reverse wire, a depression of the test button would not generate a simulated fault to be detected by the main control circuit, which, in turn, would not generate the indication signal.

After the indication signal is displayed, the reset button is able to be depressed to reestablish the electrical continuity of the circuit interrupting device. If the components in the series of circuits do not work properly, the depression of the test button does not allow the fault signal to be generated and passed through the series of circuit which results in no production of the indication signal, and the reset button is not able to be depressed so that no electrical continuity can be reestablished.

The main control circuit is capable of detecting a fault. The main components in the main control circuit includes a differential transformer and a leakage current detection chip (IC1), such as an RV4145 chip manufactured by National Semiconductor.

The end-of-life detection circuit comprises an end-of-life detection chip (IC2).

The reset/trip circuit comprises a silicon controlled rectifier (SCR), and a solenoid coil with an iron core inside the solenoid coil.

The test button contains a metal piece which is located underneath the test button, and a conductive pin which is located below the metal piece. The conductive pin is embedded in a conductive spring, which is adapted to electrically connected to one of a pair of power input terminals; and the metal piece is adapted to electrically connected to another one of the pair of power input terminals, so that when the test button is depressed, the metal piece is in contact with the conductive pin, which generates the simulated fault when the circuit interrupting device is properly wired. The simulated fault is generated through the use of a resistor, which is located at an electrical path between the conductive spring and one of the pair of the input terminals.

The test button can also mechanically trip the circuit interrupting device, so that when the circuit interrupting device is not at the tripped state, the depression of the test button will forcibly break the electrical continuity of the circuit interrupting device.

Underneath the reset button there is a flexible switch (K3), which contains a first conductive piece and a second conductive piece. The first conductive piece of the K3 is adapted to be coupled to the reset button and the second conductive piece of the K3 is adapted to be connected to a printed circuit board. The first conductive piece of the K3 is further adapted to electrically connect to a power input source; and the second conductive piece of the K3 is adapted to electrically connected to a first input end of the IC2. The depression of the reset button, coupled with the flexible switch (K3) can also perform a reverse wiring test, i.e., when the circuit interrupting device is reverse wired, the device cannot be reset.

The end of life detection circuit further comprises a triode or transistor (Q1). One end of the Q1 is electrically connected to an output end of the IC2 and the other end is to the SCR, so that when the IC2 outputs a signal to the Q1, this signal can be further emitted to SCR to activate the reset/trip circuit.

The IC2 comprises a first simulation switch (K1) and a second simulation switch (K2). Both the K1 and the K2 are operatively connected to the first input end of the IC2. When the K3 is closed, the K1 and the K2 are closed to allow a reset signal to be transmitted to the Q1.

The IC2 further comprises a plurality of inverters and a NAND gate. A second input end of the IC2 is adapted to receive a control signal from the main control circuit. The second input end is operatively connected to the plurality of inverters and the NAND gate to control open/close of the K1 and/or the K2. When the control signal is received, the open/close of the K1 and/or K2 outputs the control signal to the reset/trip circuit to activate the reset/trip circuit and generate the indication signal.

The IC2 further comprises a time delay circuit capable of configuring a time frame to control the open/close of the K1 and/or the K2.

The IC2 further comprises a third input end which receives a common collector voltage (Vcc) from a power input source. The Vcc is generated after an alternating current (AC) from the power input source passes through a diode bridge (D1-D4) to be converted to a direct current (DC), and further passes through a resistor, a diode, and a capacity to be converted to the Vcc.

The present invention also provides a ground fault circuit interrupter which comprises a housing; a tripping device positioned in a base of the housing; a printed circuit board positioned in the base of the housing; and a pair of output conductors positioned in an insulated middle support, each of the output conductors contains a pair of fixed contacts.

The printed circuit board further comprises a first pair of flexible metal pieces having a first end and a second end. The first pair of flexible metal pieces is operationally connected to the power source input terminals. The first end of each of the first pair of flexible metal pieces passes through a differential transformer and is operationally connected to a hot input line or a neutral input line; the second end of each of the first pair of flexible metal pieces has a movable contact. A second pair of flexible metal pieces has a first end and a second end. The first end of each of the second pair of flexible metal pieces is operationally connected to a hot power output terminal or a neutral power output terminal. The second end of each of the second pair of flexible metal pieces has a movable contact point. The movable contact of each of the first pair of flexible metal pieces and the movable contact of each of the second pair of flexible metal pieces are capable of connecting/disconnecting to each of the fixed contacts on the pair of output conductors.

The present invention further provides an end-of-life detection chip (IC2) in an end-of-life detection circuit of a circuit interrupting device. The IC2 comprises a plurality of pins; a first simulation switch (K1) and a second simulation switch (K2); a plurality of inverters; and a NAND gate. The plurality of pins comprises a first pin receiving a control signal from a main control circuit when the main control circuit detects a fault and the components of the main control circuit works properly; a second pin receiving a reset signal when a reset button is depressed; and a third pin outputting the control signal and/or the reset signal to a reset/trip circuit. The first pin is operatively connected to the plurality of inverters and the NAND gate to control the open/close of the K1 and/or the K2. When the control signal is received by the first pin, the open/close of the K1 and/or the K2 outputs the control signal via the third pin to the reset/trip circuit to activate the reset/trip circuit and generate an indication signal. The K1 and the K2 are further operatively connected to the second pin. When the reset signal is received by the second pin, the K1 and the K2 are closed, which allows the reset signal to be output via the third pin to the reset/trip circuit to reestablish an electrical continuity of the circuit interrupting device.

The control signal is sent from an output end of a leakage current detection chip (IC1) in the main control circuit to said the pin of said IC2. The second pin of the IC2 is electrically connected to a flexible switch (K3) in the end-of-life detection circuit. The K3 has a first conductive piece and a second conductive piece. The first conductive piece of the K3 is adapted to be coupled to the reset button and said second conductive piece of said K3 is adapted to be connected to a printed circuit board; wherein said first conductive piece of said K3 is adapted to electrically connect to a power input source; and wherein said second conductive piece of said K3 is adapted to electrically connected to said second pin of said IC2.

The third pin of the IC2 is electrically connected to a first end of a triode/transistor (Q1) and a second end of the Q1 is adapted to be electrically connected to the reset/trip circuit; whereby when said IC2 receives said control signal from said first pin or said reset signal from said second pin, said control signal or said reset signal is output via said third pin to said Q1, and to said reset/trip circuit.

The present invention further provides a method for testing a circuit interrupting device (such as a ground fault circuit interrupter (GFCI), which comprises the steps of: (1) when the circuit interrupting device is powered and at the tripped state, depressing the test button on the circuit interrupting device; and (2) if the indication signal (such as a sound) is displayed, depressing the reset button to reset the circuit interrupting device. The display of the indicating signal indicates that the components of the circuit interrupting device work properly. If the indication signal is not displayed, the circuit interrupting device may contain some components which do not work properly, and the user should consider to replace the circuit interrupting device with a new one.

Also, if the circuit interrupting device is not at the tripped state, the user should forcibly depress the test button to mechanically trip the circuit interrupting device.

BRIEF DESCRIPTION OF THE DRAWINGS

The detailed description will refer to the following drawings in which like numerals refer to like elements, and in which.

DETAILED DESCRIPTION

The present invention describes a circuit interrupting device, which includes, but is not limited to, a ground fault circuit interrupter (GFCI), an arc fault circuit interrupter (AFCI), an immersion detection circuit interrupter, an appliance leakage circuit interrupter, or a circuit breaker. The preferred circuit interrupting device is a GFCI.

The following experimental designs and result are illustrative, but not limiting the scope of the present invention. Reasonable variations, such as those occur to reasonable artisan, can be made herein without departing from the scope of the present invention. Also, in describing the invention, specific terminology is employed for the sake of clarity. However, the invention is not intended to be limited to the specific terminology so selected. It is to be understood that each specific element includes all technical equivalents which operate in a similar manner to accomplish a similar purpose.

Figure 1:
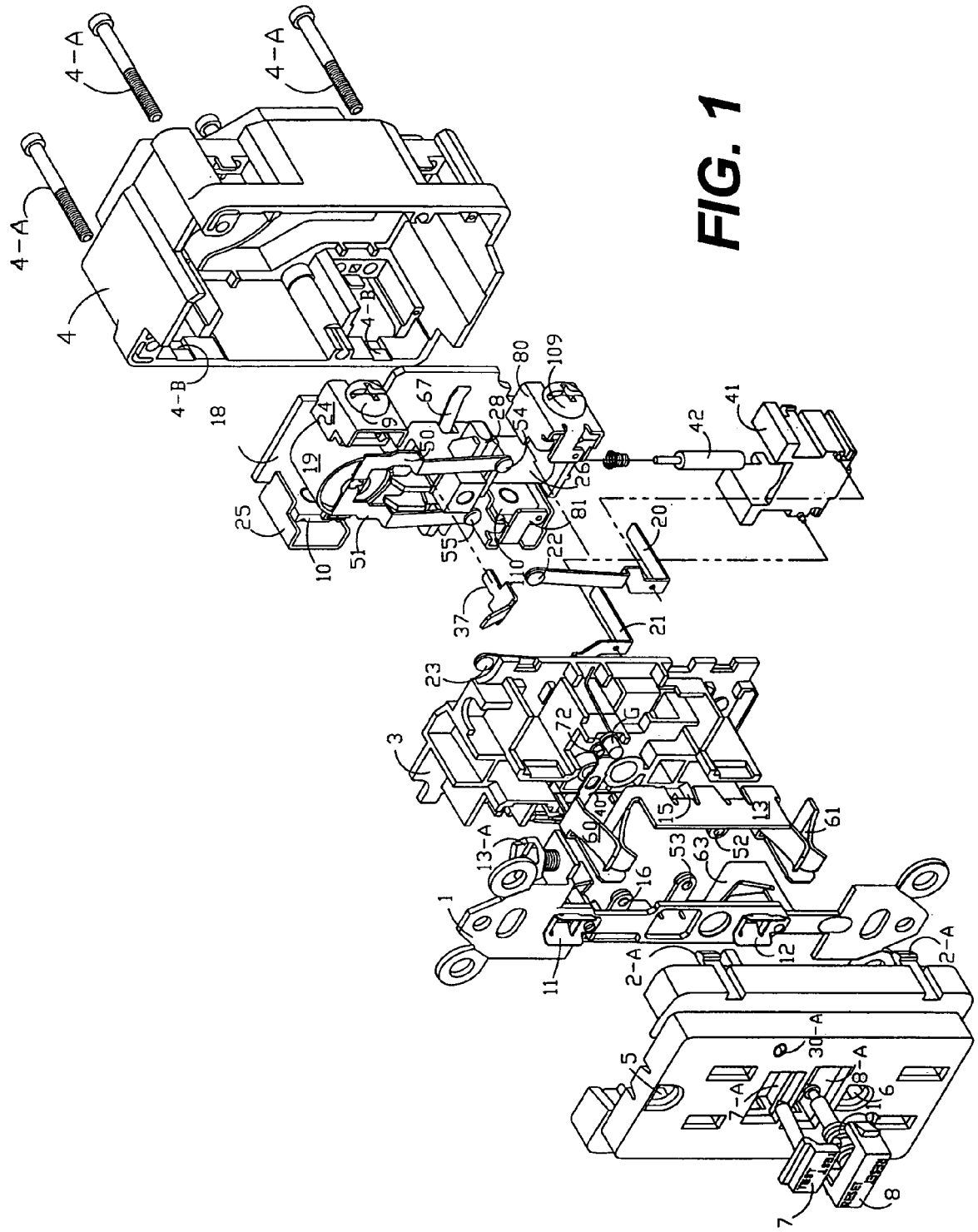
FIG. 1 is an exploded view illustrating the structure of an exemplary ground fault circuit interrupter (GFCI) that provides an end of life test which is triggered by the depression of the test button.
Figure 2:
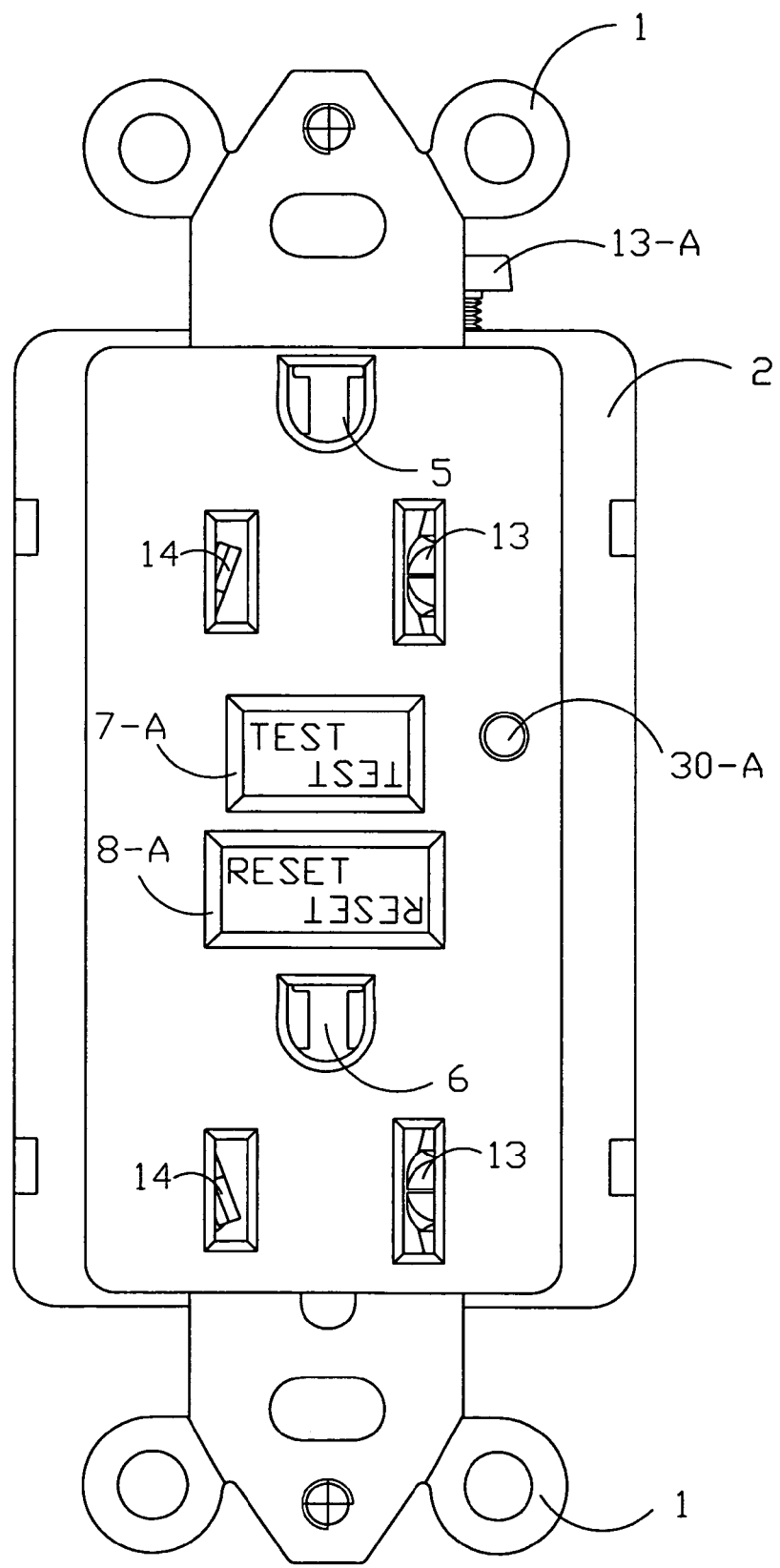
FIG. 2 is the front view of the exemplary GFCI of FIG. 1.
Figure 3:
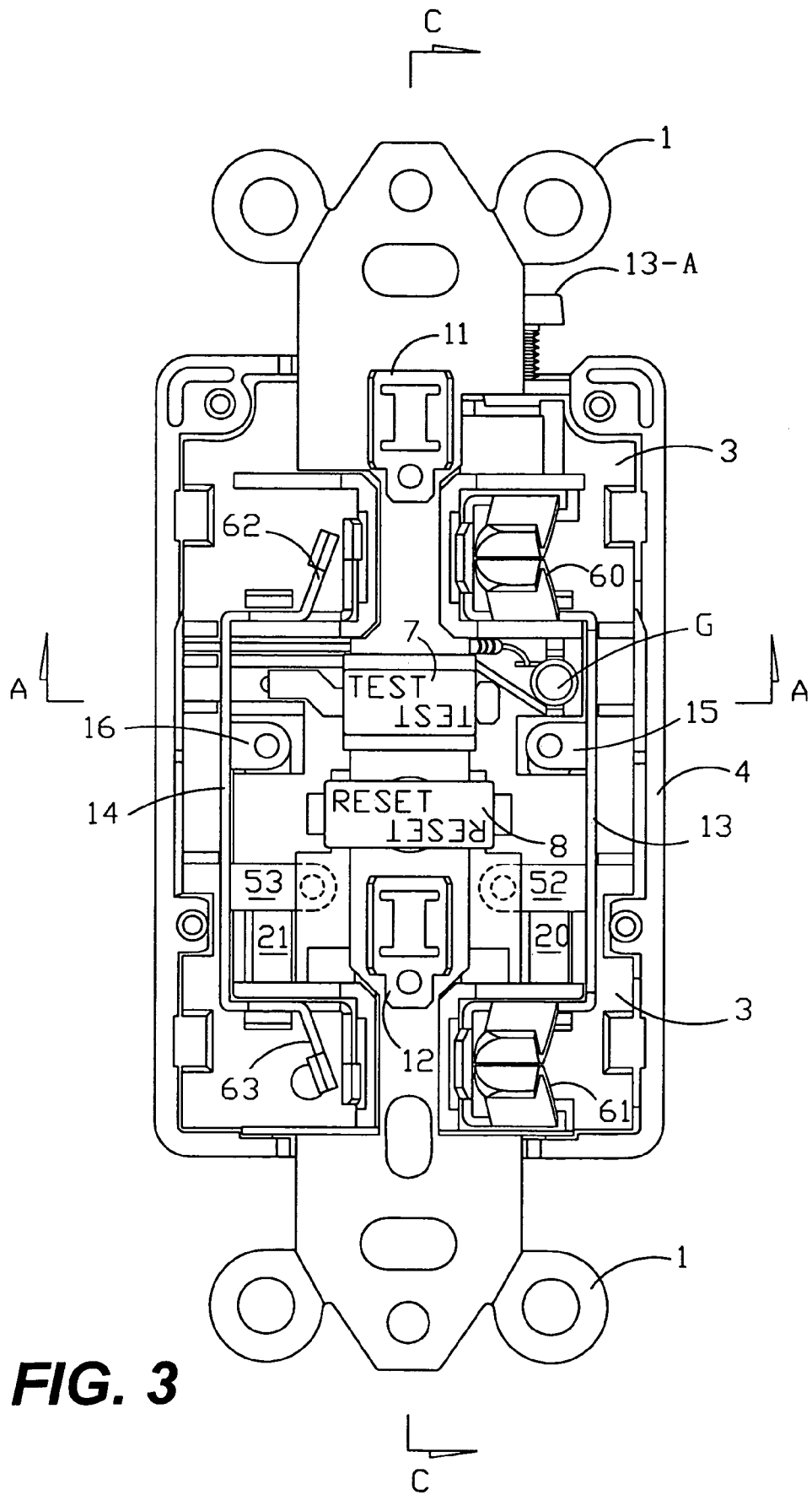
FIG. 3 is the front view of the exemplary GFCI of FIG. 1 with the front lid removed.

FIG. 1 illustrates an exemplary circuit interrupting device, i.e., a ground fault circuit interrupter (GFCI), that provides an end of life test. FIG. 2 is the front view of the exemplary GFCI of FIG. 1. FIG. 3 is the front view of the exemplary GFCI of FIG. 1 with the front lid removed. The GFCI includes a housing and a circuit board 18 that is located inside the housing. The circuit board 18 is capable of detecting whether the GFCI has come to the end of its service life by pressing a test button.

The housing includes a front lid 2, an insulated mid-level support 3, and a base 4. A metal grounding installation board 1 is located between the front lid 2 and the insulated mid-level support 3. The circuit board 18 is located between the insulated mid-level support 3 and the base 4.

As shown in FIG. 1 and FIG. 2, power output sockets 5, 6, a reset button hole 8-A, a test button hole 7-A, and a status indicating light hole 30-A are located on the front lid 2. A reset button 8 and a test button 7 are located in the reset button hole 8-A and the test button hole 7-A, respectively. The reset button hole 8-A and the test button hole 7-A penetrate through the metal ground installation board 1 and the insulated mid-level support 3 and make contact with the components on the circuit board 18. An indicator light G is embedded in the status indicating light hole 30-A. Four clamp hooks 2-A are located on the side of the front lid 2 to be used for fastening a groove 4-B on the base 4.

The metal grounding installation board 1 is grounded through a ground screw 13-A (as shown in FIG. 1 and FIG. 2) and wires. Grounding pieces 11, 12 are located on the metal ground installation board 1 at locations corresponding to the ground holes of the power output sockets 5, 6 of the front lid 2.

As shown in FIGS. 1 and 3, a hot power output conductor 14 and a neutral power output conductor 13 are installed on the two sides of the insulated mid-level support 3. At the two ends of the power output conductors 13, 14, gripping wing pieces 60, 61, 62, 63 are arranged at the places corresponding to the hot and neutral holes of the power output sockets 5, 6 on the front lid 2. Fixed contacts 15, 52 and 16, 53 are arranged on the power output conductors 13 and 14, respectively, to form two pairs of fixed contacts "15, 16" and "52, 53."

Figure 7:
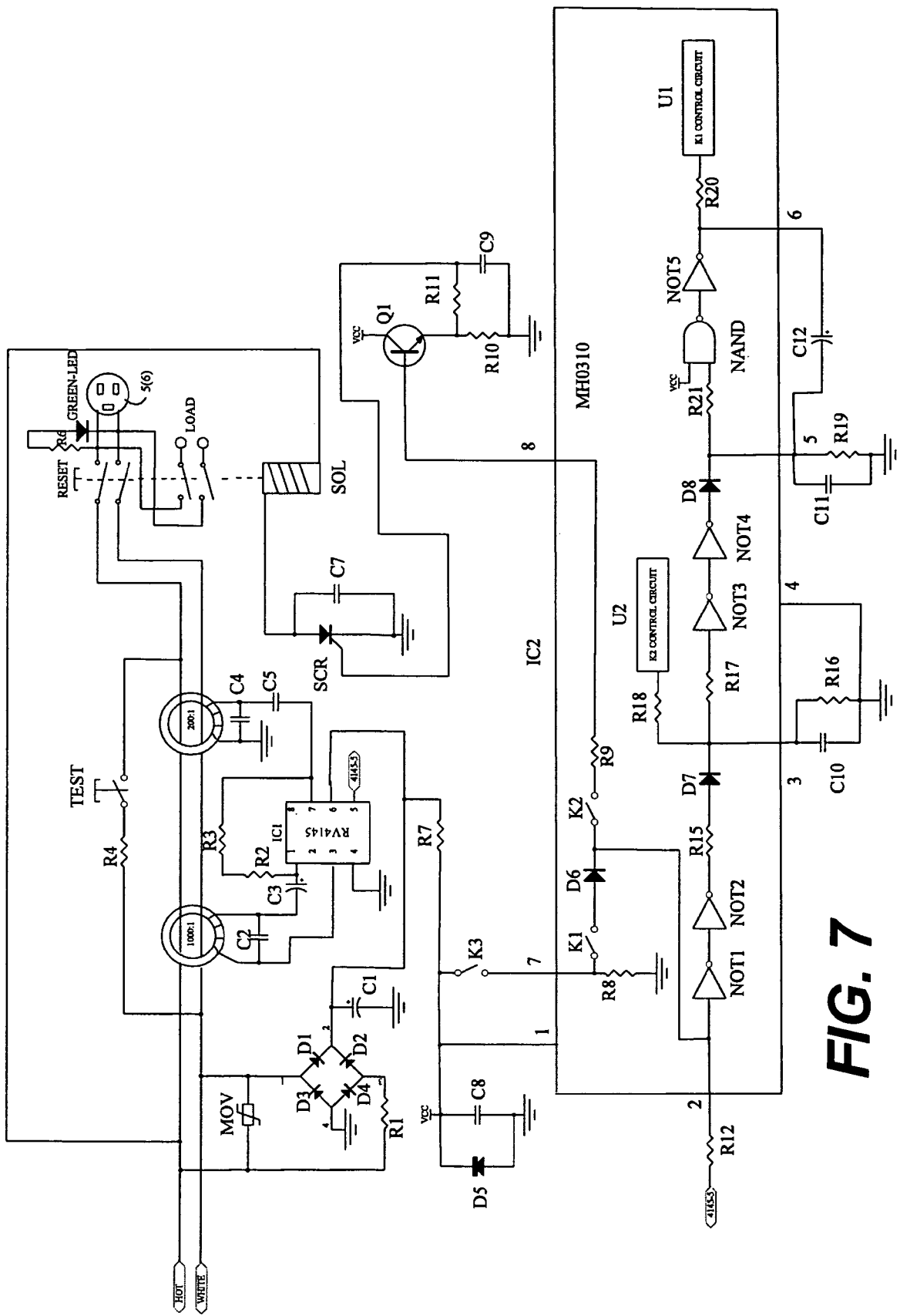
FIG. 7 illustrates a schematic view of exemplary circuit connections of the control circuit of the exemplary GFCI of FIG. 1.

A green indicator light G is also soldered onto the insulated mid-level support 3. The green indicator light G is embedded inside the status indicating light hole 30-A on the front lid 2. The two ends of the green indicator light G are connected to the hot and neutral wires of the GFCI power output (as shown in FIG. 7) to indicate the status of the GFCI.

As shown in FIG. 1, the base 4 is used to accommodate the insulated mid-level support 3 and the circuit board 18. A pair of hot and neutral power input wiring screws 9, 10 and a pair of hot and neutral power output wiring screws 109, 110 are installed symmetrically on the two sides of the base 4.

The circuit board 18, which is installed inside the housing, is capable of supplying power to or cutting off power from the power output sockets 5, 6 of the front lid 2 and the power output wiring screws 109, 110 on the two sides of the base 4, detecting whether the GFCI has come to the end of its service life, issuing warning signals, and performing a forcible mechanical release.

Figure 4:
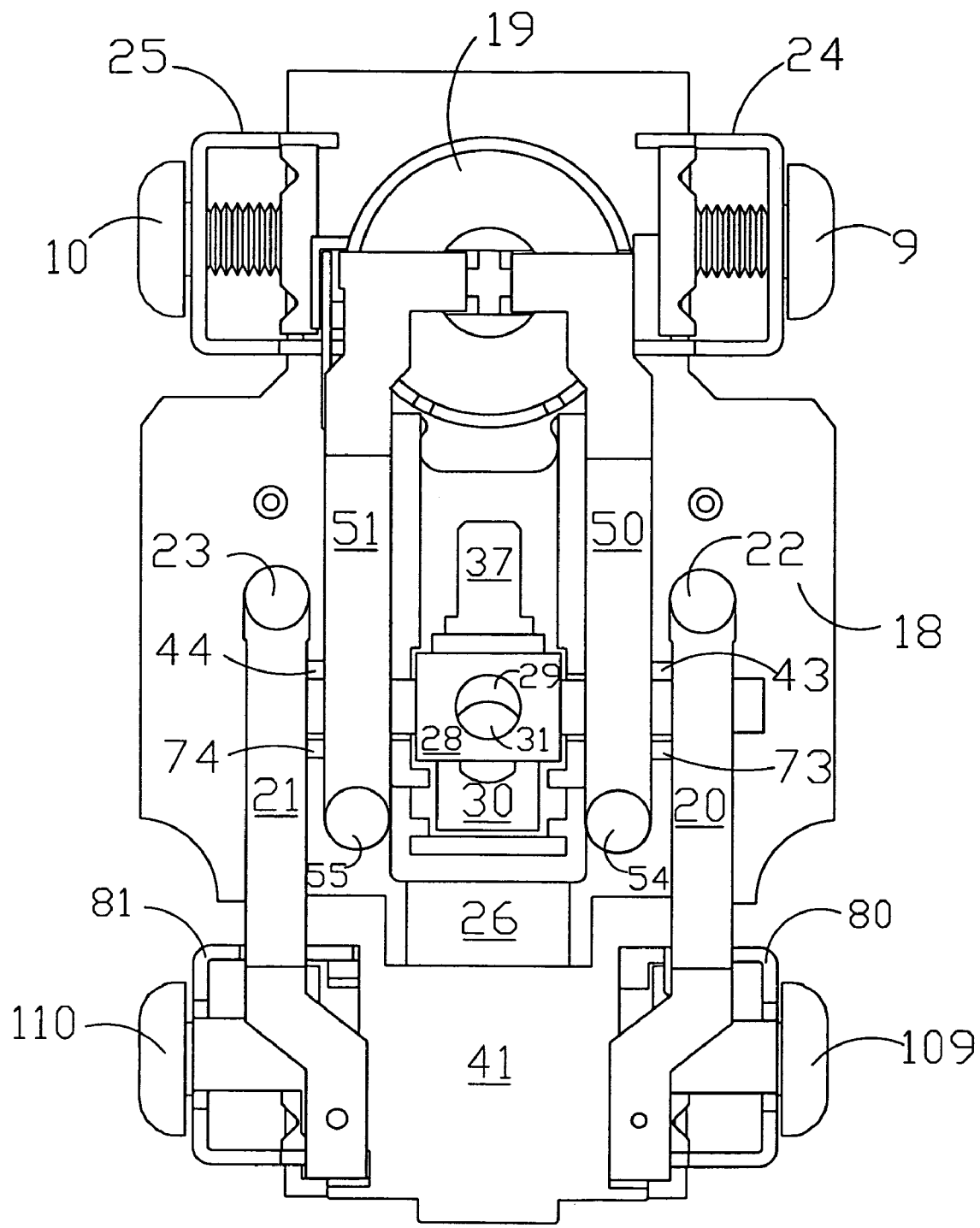
FIG. 4 illustrates exemplary relationships among the components of the circuit board of the exemplary GFCI of FIG. 1.

FIG. 4 illustrates exemplary relationships among the components of the circuit board 18. As shown in FIG. 1 and FIG. 4, a flexible neutral power input metal piece 50 and a flexible hot power input metal piece 51 are located on the circuit board 18. One end of the flexible neutral power input metal piece 50 is bent 90 degrees downwards and penetrates through a differential transformer 19. This end of the flexible neutral power input metal piece 50 is soldered onto the circuit board 18 and connected to the neutral power input wiring screw 9 through an input wiring piece 24. Similarly, one end of the flexible hot power input metal piece 51 is also bent 90 degrees downwards and penetrates through the differential transformer 19. This end of the flexible hot power input metal piece 51 is soldered onto the circuit board 18 and connected to the hot power input wiring screw 10 through an input wiring piece 25. The neutral power input wiring screw 9 is connected to a neutral wire inside a wall through a conductive wire. The hot power input wiring screw 10 is connected to a hot wire inside the wall through a conductive wire.

A movable contact 54 is located on the opposite end of the flexible neutral power input metal piece 50. A movable contact 55 is located on the opposite end of the flexible hot power input metal piece 51. The movable contacts 54, 55 respectively correspond to fixed contacts 52, 53 on the power output conductors 13, 14 located on the insulated mid-level support 3 (as shown in FIG. 3). Two flexible neutral output metal pieces 20, 21 are located above and on the sides of the circuit board 18. One end of the flexible neutral output metal piece 20 is soldered onto the circuit board 18, together with the neutral power output terminal 80, and is connected to the neutral power output wiring screw 109 located on the base 4. The movable contact 22 is located on the opposite end of the flexible neutral output metal piece 20. Similarly, one end of the flexible hot output metal piece 21 is soldered onto the circuit board 18, together with the hot power output terminal 81, and is connected to the hot power output wiring screw 110 located on the base 4. The movable contact 23 is located on the opposite end of the flexible hot output metal piece 21. These movable contacts 22, 23 respectively correspond to fixed contacts 15, 16 on the neutral power output conductor 13 and the hot power output conductor 14 (as shown in FIG. 3). The movable contacts and the fixed contacts on the flexible power input metal pieces 50, 51 and the power output conductor 13, 14 together constitute two groups of four pairs of power switches, e.g., "54 and 52," "22 and 15," "55 and 53," and "23 and 16."

The differential transformer 19, also located on the circuit board 18, is capable of detecting a leakage current. As shown in FIG. 7, a hot wire ("HOT") and a neutral wire ("WHITE") penetrate through the differential transformer 19. When an electrical current leakage occurs in a power supply loop, the differential transformer 19 outputs a voltage signal to an electric current detection control chip IC1 (e.g., model number RV4145 manufactured by National Seminonductor). The electric current detection control chip outputs a control signal to turn on a tripping device to trip the devices on the circuit board 18 so as to interrupt the power output.

Figure 5A:
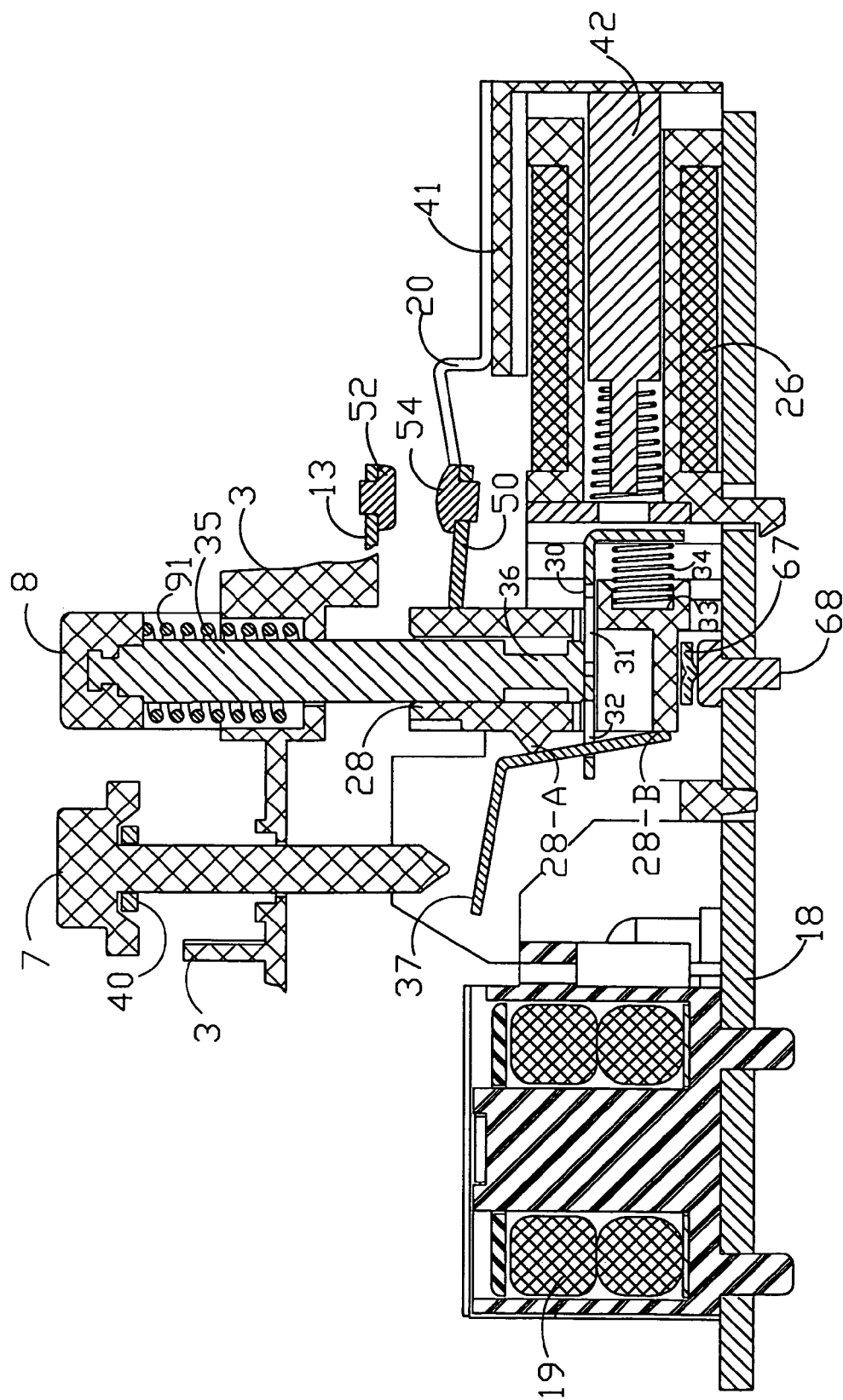
FIG. 5A is a partial cross-sectional view along the C-C line in FIG. 3, where the GFCI is illustrated to be in a reset and start configuration.

FIG. 5A is a partial cross-sectional view along the C-C line in FIG. 3, where the GFCI is illustrated to be in a reset and start configuration. As shown in FIG. 1, FIG. 4 and FIG. 5A, the tripping device, which is located on the circuit board 18, may enable the flexible power input metal pieces 50, 51 and the power output conductors 13, 14 to be connected or disconnected, thus supplying power to or cutting off power from the flexible power output metal pieces 20, 21 and the power output terminals 80, 81 through the power output conductors 13, 14. The tripping device includes a tripper 28, a locking member 30, a locking spring 34, a tripping lever 37, and a solenoid coil 26, i.e., solenoid coil (SOL).

The tripper 28 may have a cylindrical body and is located below the reset button 8. The left side and the right side of the tripper 28 extend outwardly to form lifting arms. The flexible power input metal pieces 50, 51 and the flexible power output metal pieces 20, 21 are located on the upper part of the lifting arms on both sides of the tripper 28 and can move up and down with the tripper 28. As shown in FIG. 4, the movable contact 54 on the flexible neutral power input metal piece 50 and the movable contact 22 on the flexible neutral output metal piece 20 cross each other at a position above the side lifting arm of the tripper 28. Similarly, the movable contact 55 on the flexible hot power input metal piece 51 and the movable contact 23 on the flexible hot output metal piece 21 cross each other at a position above the side lifting arm of the tripper 28.

A longitudinal central through hole 29 is formed on top of the tripper 28 and is embedded in a reset directional lock 35, which is equipped with a reset spring 91 and embedded at the bottom of the reset button 8. The reset directional lock 35 has a blunt end and is movable in a vertical direction in the central through hole 29. A circular recessed locking slot 36 is formed in the lower part of the reset directional lock 35 close to the bottom of the reset directional lock 35 to form a groove. A movable "L"-shaped locking member 30 made of a metal material is arranged in the lower part of tripper 28 and penetrates through the tripper 28. A through hole 31 is formed on the horizontal side of the locking member 30. The locking member 30 is movable through the through hole 31 in a horizontal direction between an aligned position (in which the through hole 31 of the locking member 30 is aligned with the blunt end of the rest directional lock 35 to allow the rest directional lock 35 to pass through) and a misaligned position (in which the circular recess locking slot 36 of the directional lock 35 is locked into the through hole 31 of the locking member 30). A circular slot 33 is formed between the side wall of tripper 28 and the inner side of the locking member 30. The locking spring 34 is arranged in the circular slot 33. The solenoid coil 26 with a built-in movable iron core 42 is arranged outside of the side wall of the locking member 30. The movable iron core 42 inside the solenoid coil 26 faces the side wall of the locking member 30. A protective shield 41 is arranged above the solenoid coil 26. One end of the insulated mid-level support 3 presses against the protective shield 41.

A hole 32 is formed at one end on the top surface of the locking member 30. The "7"-shaped tripping lever 37 penetrates through the hole 32. The tripping lever 37 is located directly underneath the test button 7. A pivot point 28-A is arranged on the side wall of tripper 28 close to the tripping lever 37. The tripping lever 37 can rotate around the pivot point 28-A on the side wall of tripper 28.

The tripper 28, the locking member 30, the locking spring 34, and the tripping lever 37 are connected to each other to form an integral body that can move freely.

As shown in FIG. 4, two pairs of position limiting pieces 43, 44 as well as 73, 74 are arranged on the protective shield 41 of the solenoid coil 26 below the movable contacts of the flexible power input metal pieces 50, 51 and below the flexible output metal pieces 20, 21.

FIG. 7 illustrates a schematic view of exemplary circuit connections of the control circuit of the GFCI. As shown in FIG. 5A and FIG. 7, a flexible switch K3, which is made of a flexible metal material, is located between the bottom of the tripper 28 and the circuit board 18. The flexible switch K3 contains two conductive pieces 67, 68, one is coupled to the reset button 8, and the other is coupled to the printed circuit board 18. Each of the two conductive pieces has a contact. When the reset button 8 is depressed, the flexible switch K3 closes. When the reset button 8 is released, the flexible switch K3 is opened. The flexible switch K3 is further electrically connected to a power source. An alternating circuit (AC) from the power source passes through a diode bridge (D1 to D4) to be converted into a direct current (DC). The DC is further converted to a common collector voltage (Vcc) through resistor R7, diode D5, and capacitor C8. The Vcc supplies power to the IC2 via pin 7.

As shown in FIG. 7, the two differential transformer 19, the leakage current detection chip IC1, resistors R2, R3, and capacitors C2-C5 constitute a main control circuit. When a leakage current (such as a ground fault or a simulated fault) occurs, it causes an electrical imbalance between the hot wire ("HOT") and the neutral wire ("WHITE") of the differential transformer 19. The differential transformer 19 immediately outputs a voltage signal to the leakage current detection chip IC1. Pin 5 of the leakage current detection chip IC1 outputs a high level voltage signal.

The test button 7 and a test resistor R4 constitute a simulated leakage current generation circuit. One end of the test button 7 is connected to the hot wire ("HOT"). The opposite end of the test button 7 is connected to the neutral wire ("WHITE") through the test resistor R4. When the test button 7 is depressed, the hot and neutral wires have a short and generate a leakage current. If the components of the GFCI work normally, pin 5 of the leakage current detection chip IC1 outputs a high level signal.

A silicon controlled rectifier (SCR), the solenoid coil 26 with the built-in iron core 42, and a capacitor C7 constitute a reset/trip circuit. One end of the solenoid coil 26 is connected with the hot wire ("HOT") of the power line input end of the GFCI, and the opposite end of the solenoid coil 26 is connected to the positive end of the silicon controlled rectifier. The negative end of the silicon controlled rectifier is connected to the ground. When the control pole of the silicon controlled rectifier is at a high level voltage, the silicon controlled rectifier is triggered to become conductive. The solenoid coil 26 is energized so that current flows through the solenoid coil 26 to generate an electromagnetic field. The iron core 42 inside the solenoid coil 26 moves to plunge the locking member 30 of the tripping device to display a clatter sound "da." At this time, the reset button 8 is popped up and the GFCI is tripped. After the displayed of the clatter sound, the reset button 8 can be depressed to allow the GFCI to be reset. When the GFCI is reset, the GFCI's load output ends, i.e., the power output wiring screws 109, 110, as well as the tri-pronged user accessible power output sockets 5, 6 on the face plate of the GFCI all have power output. When the reset button 8 is popped up or when the GFCI is tripped, the power output wiring screws 109, 110 and the tri-pronged user accessible power output sockets 5, 6 have no power.

The flexible switch K3 which are coupled to the reset button 8, a triode Q1, resistors R7, R16, R19, and capacitors C8-C12, and the end-of-life detection chip IC2 constitute an end-of-life detection circuit. Pin 1 of the end-of-life detection chip IC2 is connected to the positive pole of a direct current power supply output by a diode rectification bridge D1-D4 through the resistor R7, and generates a regulated direct current power supply (i.e., common collector voltage) Vcc through R7, D5, C8, thus providing power for the end-of-life detection chip IC2 and the triode Q1. Pin 2 of the end-of-life detection chip IC2 is connected to pin 5 of the leakage current detection chip IC1 through a resistor R12 and receives a control signal from the leakage current detection chip IC1. Pin 3 of the end-of-life detection chip IC2 is connected to the ground through parallel connected C10, R16. Pin 4 of the end-of-life detection chip IC2 is connected to the ground. Pin 5 of the end-of-life detection chip IC2 is connected to the ground through parallel connected C11, R19. Pin 6 of the end-of-life detection chip IC2 is connected to pin 5 through the capacitor C12. C11, C12, R19, which are connected to pin 5, pin 6 of the end-of-life detection chip IC2, may be used to eliminate an instant high level signal output by pin 6 when the GFCI is supplied power and to adjust the setup time of the mono-stable timing circuit. A control signal input pin 7 of the end-of-life detection chip IC2 is connected to the direct current power supply Vcc through the flexible switch K3, which is coupled to the reset button 8. A control signal output pin 8 of the end-of-life detection chip IC2 is connected to the base of the triode Q1. The collector of the triode Q1 is connected to the direct current power supply Vcc. The emitter of the triode Q1 is connected to the control pole of the silicon controlled rectifier through a resistor R11, and at the same time, the emitter of the triode Q1 is also connected to the ground through a resistor R10 and the capacitor C9. The triode Q1 can be changed to a transistor.

An embodiment of the end-of-life detection chip IC2 is an integrated circuit, which includes inverter NOT1-NOT5, a NAND gate, two electronic simulation switches K1, K2, a control circuit U1 that controls the opening or closing of the electronic simulation switch K1, and a control circuit U2 that controls the opening or closing of the electronic simulation switch K2. The end-of-life detection chip IC2's internal connection relation is as follows. Pin 2 of the end-of-life detection chip IC2 is connected to two inverters NOT1, NOT2, and is further connected to the control circuit U2 through a delay circuit and a resistor R8 to control the opening or closing of the electronic simulation switch K2. The delay circuit includes R15, D7, C10, R16. Pin 2 of the end-of-life detection chip IC2 is further connected to the control circuit U1 through a serial connection with a resistor R17, two inverters NOT1, NOT4, a diode D8, a resistor R21, the NAND gate, the inverter NOT5, and a resistor R20 to control the opening or closing of the electronic simulation switch K1.

The resistor R8 inside the end-of-life detection chip IC2 may be used to eliminate noise signals. A diode D6 controls one way turn-ons of the electronic simulation switch K1. The resistor R9, the triode Q1, and the resistor R10 constitute an emitter tracker to drive the silicon controlled rectifier. The resistor R11 and the capacitor C9 may be used for filtering to eliminate interference signals and noises. R15, D7, C10, and R16 constitute a time delay circuit capable of configuring a time frame to control the open/close of the K1 and/or K2.

An embodiment of the end-of-life detection chip IC2 detects whether a GFCI has come to its end of life as follows. After the hot wire ("HOT") and the neutral wire ("WHITE") on the GFCI's input end are properly connected to the hot and the neutral wires inside the wall, the main power supply may be turned on. An alternate current voltage is applied to a control circuit input line. This alternate current voltage outputs a direct current voltage to the leakage current detection chip IC1 after being rectified by the diode rectification bridge D1-D4. At the same time, this direct current voltage provides a work voltage Vcc to pin 1 of the end-of-life detection chip IC2 through the regulated voltage circuit that includes R7, D5, C8. At this time, pin 1 of the end-of-life detection chip IC2 is at a high level and pin 2 is at a low level. The electronic simulation switch K1 inside the end-of-life detection chip IC2 is in an open state, and the electronic simulation switch K2 is in a closed state. Since pin 2 of the end-of-life detection chip IC2 is at a low level, pin 8 of the end-of-life detection chip IC2 is also at a low level. The triode Q1 is terminated and the silicon controlled rectifier is not on. No electric current passes through solenoid coil 26 and no electro-magnetic field is generated. The iron core 42 inside the solenoid coil 26 is not activated, neither is the tripping device that includes the tripper 28, the locking member 30, and the locking spring 34.

At this time, if the reset button 8 is pressed for a reset, since pin 8 of the end-of-life detection chip IC2 is at a low level, the triode Q1 is terminated and the silicon controlled rectifier is not on. No electric current passes through the solenoid coil 26 and no electro-magnetic field is generated. The iron core 42 inside the solenoid coil 26 is not activated, neither is the tripping device. Accordingly, the reset button 8 for reset cannot be accomplished. Neither the GFCI's output end nor the tri-pronged user accessible power output sockets 5, 6 have power output. The GFCI is stably connected in the power supply circuit. The test button 7 may need to be pressed first for a test to detect whether the GFCI is still capable of providing ground fault protection against any electrical current leakage and whether the GFCI has come to the end of its service life (see below).

Figure 5B:
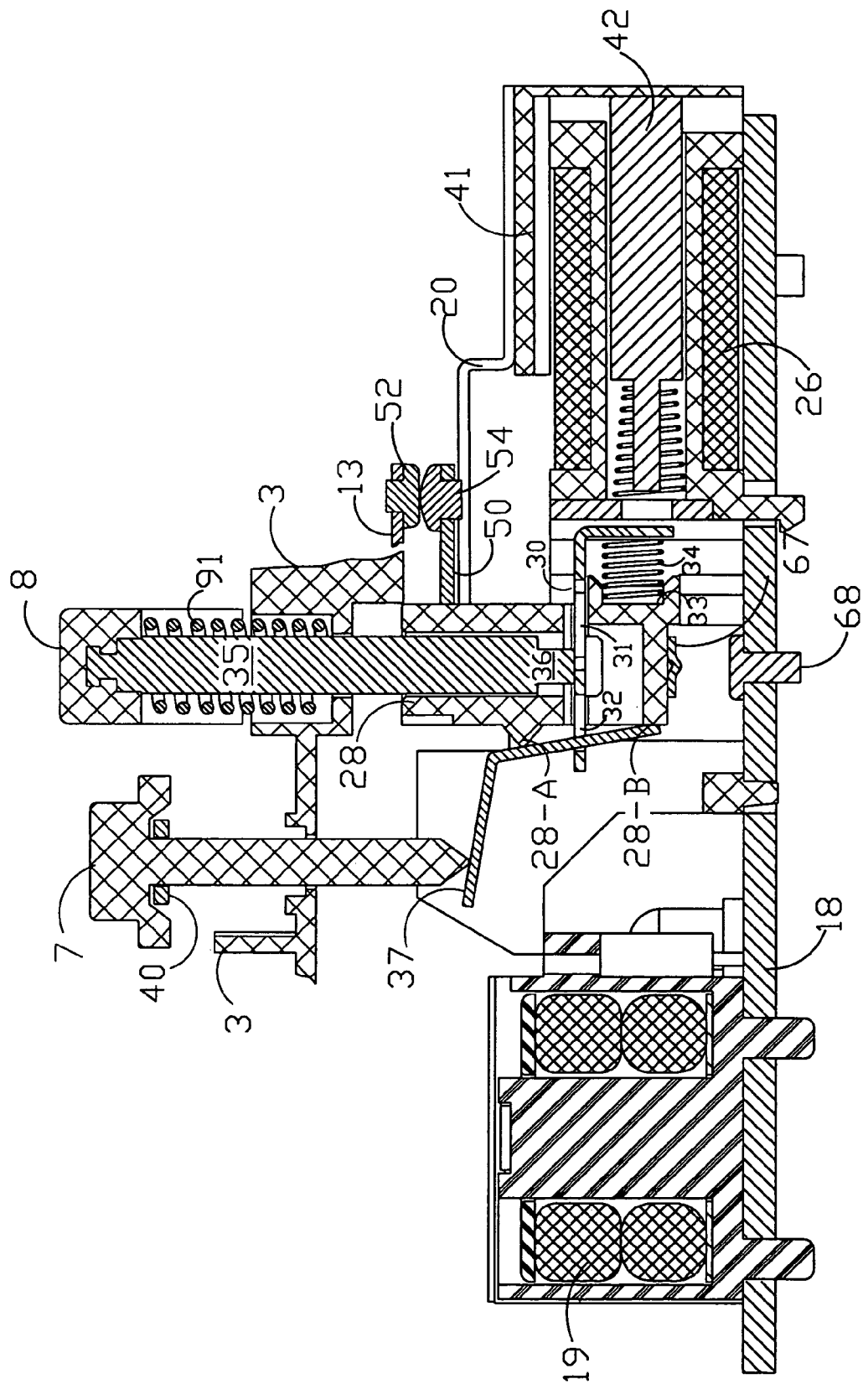
FIG. 5B is a partial cross-sectional view along the C-C line in FIG. 3, where the GFCI is illustrated to be in a normal working configuration.
Figure 5C:
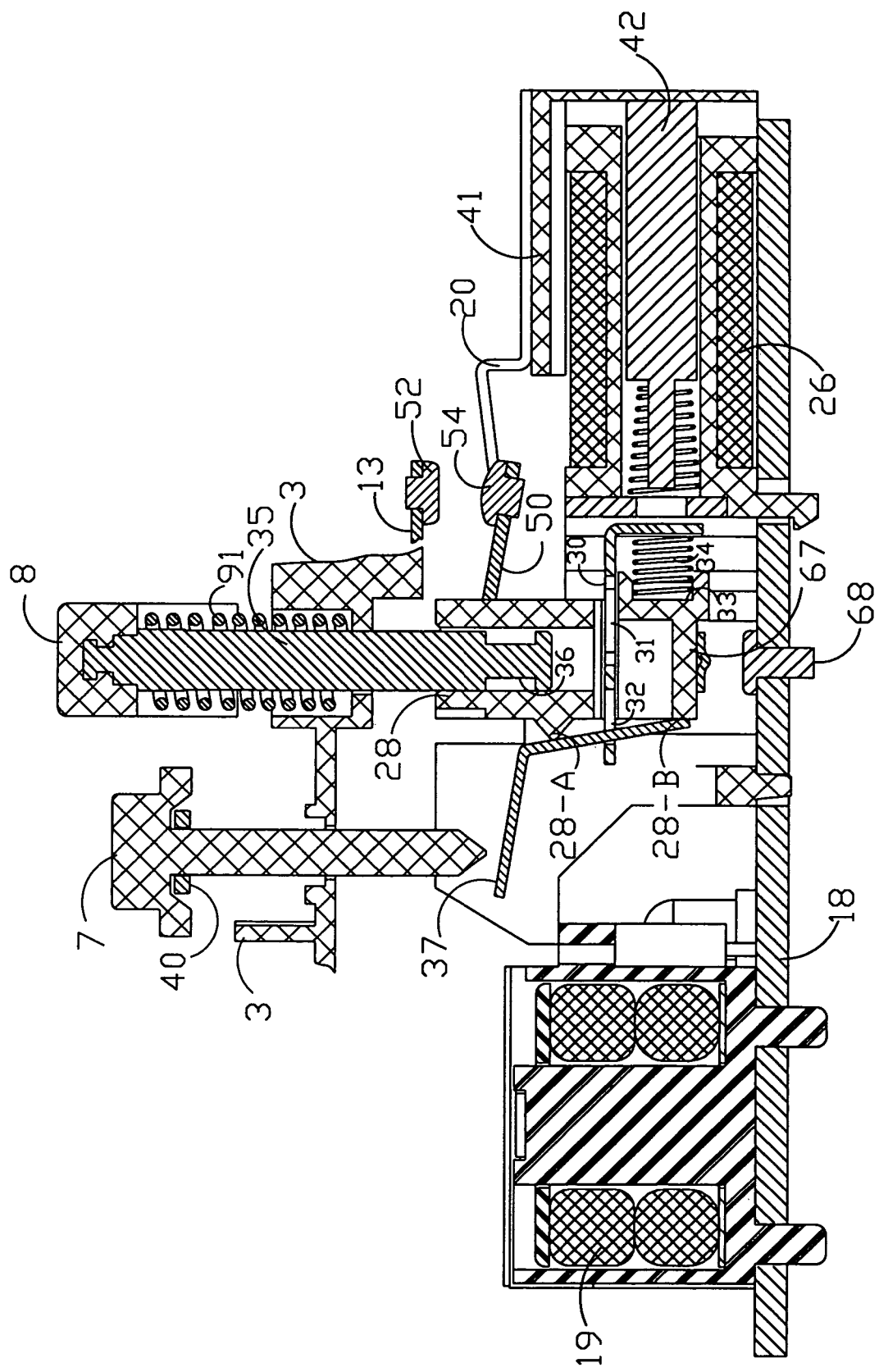
FIG. 5C is a partial cross-sectional view along the C-C line in FIG. 3, illustrating the trip status of the GFCI after a test button is depressed.

FIG. 5B is a partial cross-sectional view along the C-C line in FIG. 3, where the GFCI is illustrated to be in a normal working configuration. FIG. 5C is a partial cross-sectional view along the C-C line in FIG. 3, illustrating the trip status of the GFCI after a test button is pressed.

Pressing the test button 7 generates a simulated leakage current, so that the electric current that penetrates through the hot wire ("HOT") and the neutral wire ("WHITE") of the differential transformer 19 is imbalanced. If the GFCI is intact and has not come to the end of its service life, the differential transformer 19 detects the current leakage and immediately outputs a voltage signal to the leakage current detection chip IC1. Pin 5 of the leakage current detection chip IC1 outputs a high level signal to pin 2 of the end-of-life detection chip IC2, which turns from a low level into a high level. Pin 8 of the end-of-life detection chip IC2 also outputs a high level signal. The triode Q1 is turned on and the silicon controlled rectifier is triggered to become conductive. The solenoid coil 26 with a built-in iron core 42 is energized so that current flows through the solenoid coil 26 to generate an electro-magnetic field. The iron core 42 inside the solenoid coil 26 moves to push the locking member 30 of the tripping device. An indication signal, such as a "clatter" sound, may be generated from inside the GFCI, indicating that the GFCI is intact, has not come to the end of its service life, and can be safely used.

By contrast, if the GFCI has come to the end of its service life and cannot detect a leakage current, pin 5 of the leakage current detection chip IC1 cannot output a high level signal. Pin 2 of the end-of-life detection chip IC2 is still at a low level, so is Pin 8 of the end-of-life detection chip IC2. The triode Q1 is not turned on. The silicon controlled rectifier is in a closed state. The reset/trip circuit, which includes the solenoid coil 26 with the built-in iron core 42 and the capacitor C7, is not supplied power. No electric current passes through the solenoid coil 26 and no electromagnetic field is generated. The iron core 42 inside the solenoid coil 26 is not activated. No "clatter" sound is generated, which indicates that the GFCI has come to the end of its service life and can no longer be safely used.

If the GFCI is intact, pin 2 of the end-of-life detection chip IC2 is at a high level. Driven by the inverters NOT1, NOT2, this high level signal passes through the delay circuit, which includes R15, D7, C10, R16, and generates a control signal to the control circuit U2 to open the electronic simulation switch K2. Similarly, driven by the inverters NOT3, NOT4, this high level signal triggers the mono-stable timing circuit, which includes the NAND gate and the inverter NOT5, and causes the inverter NOT5 to output a high level signal to the control circuit U1 to close the electronic simulation switch K1.

When the test button 7 is pressed to test the GFCI and the GFCI has not come to the end of its service life, releasing the test button 7 causes the simulated leakage current to disappear. Pin 5 of the leakage current detection chip IC1 changes to a low level signal, so does pin 2 of the end-of-life detection chip IC2. The electronic simulation switch K2 automatically closes.

After hearing the "clatter" sound, a user may press the reset button 8. Since the flexible switch K3 is coupled to the reset button 8, the flexible switch K3 closes when the reset button 8 is pressed. At this time, switches K1, K2, K3 are all in a closed state. Pin 8 of the end-of-life detection chip IC2 outputs a high level signal. The triode Q1 is turned on. The silicon controlled rectifier in the reset/trip circuit is triggered to become conductive. The solenoid coil 26 is supplied power so that current flows through the solenoid coil 26 to generate an electro-magnetic field. The iron core 42 inside the solenoid coil 26 moves to push the locking member 30 of the tripping device.

As shown in FIG. 5B, the circular recessed locking slot 36 of the reset directional lock 35 embedded at the bottom of the reset button 8 is seized in the through hole 31 of the locking member 30. When the reset button 8 is released, the tripper 28 moves up to elevate the flexible metal pieces 50, 51, 20, 21 located above the lifting arms on the two sides of the tripper 28. As a result, the movable contacts 54, 55 on the flexible power input metal pieces 50, 51 make contact with the fixed contacts 52, 53 on the power output conductors 13, 14 to power up the output conductors 13, 14. Powering up the output conductors 13, 14 in turn allows the flow of electricity to the tri-pronged user accessible power output sockets 5, 6 on the face of the GFCI. Also, the movable contacts 22, 23 on the flexible output metal pieces 20, 21 make contact with the fixed contacts 15, 16 on the power output conductors 13, 14 to power up the flexible output metal pieces 20, 21, which are in contact with the power output terminals 80, 81. Powering up the flexible output metal pieces 20, 21 allows electricity to be output to the power output terminals 80, 81 of the GFCI and to the tri-pronged user accessible power output sockets 5, 6 on the face of the GFCI. As a result, the GFCI operates normally.

The mono-stable timing circuit may be set for, e.g., 5 minutes, to keep the electronic simulation switch K1 in a closed state. After the set time expires, the mono-stable timing circuit is automatically restored to its initial state. The inverter NOT5 outputs a low level signal, the electronic simulation switch K1 is automatically opened and the electronic simulation switch K12 continues to be closed.

Figure 6:
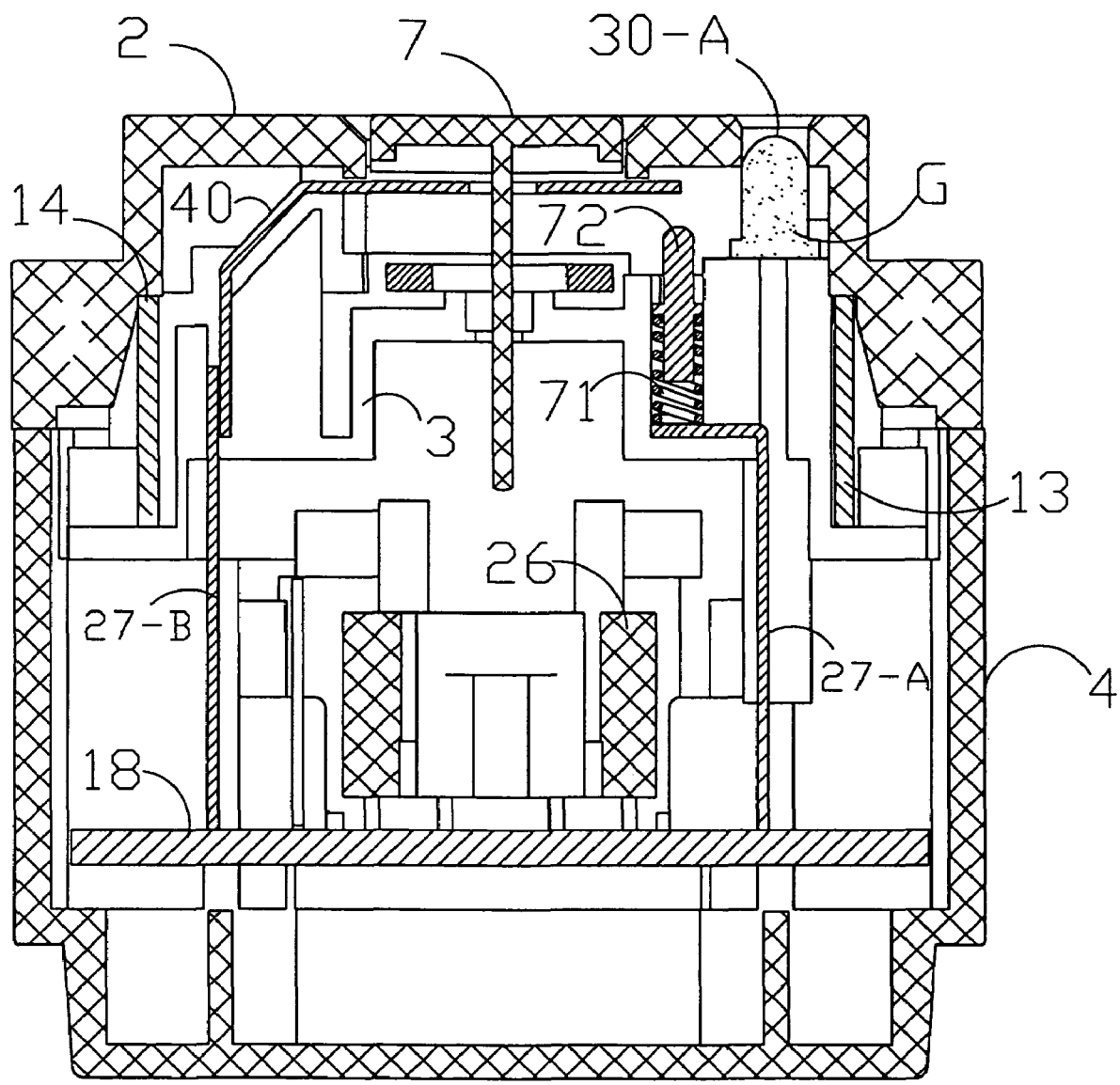
FIG. 6 is a partial cross-sectional view along the A-A line in FIG. 3, illustrating the GFCI being tripped after the test button is depressed.

FIG. 6 is a partial cross-sectional view along the A-A line in FIG. 3, illustrating the GFCI being tripped after the test button is pressed. As shown in FIG. 5C, FIG. 6 and FIG. 7, a metal piece 40 is located below the test button 7. A conductive pin 72 is located below the metal piece 40. The conductive pin 72 is embedded in a conductive spring 71, which is connected to the neutral wire ("WHITE") through a conductive wire 27-A and the test resistor R4. The metal piece 40 is connected to the hot wire ("HOT") through a conductive wire 27-B.

As shown in FIG. 5C, when the test button 7 is pressed, the circular recessed locking slot 36 at the bottom of the reset directional lock 35 jumps out of the through hole 31 of the locking member 30. When the reset button 8 is released, the tripper 28 drops down. The flexible metal pieces 50, 51, 20, 21 located above the two lifting arms of the tripper 28 drop as well to disconnect the movable contacts 54, 55 on the flexible power input metal pieces 50, 51 from the fixed contacts 52, 53 on the power output conductors 13, 14. The fixed contacts 15, 16 on the power output conductors 13, 14 are disconnected from the movable contacts 22, 23 on the flexible output metal pieces 20, 21 so that neither the power output conductors 13, 14 nor the flexible output metal pieces 20, 21 are supplied power. As a result, no power is output to the power output terminals 80, 81 of the GFCI or to the tri-pronged user accessible power output sockets 5, 6 on the face of the front lid 2 of the GFCI, so that the entire power output of the GFCI is interrupted. Driven by the inverters NOT1, NOT2, a signal passes through the time delay circuit, which includes R15, D7, C10, R16, and generates a control signal to open the electronic simulation switch K2. Similarly, driven by the inverters NOT3, NOT4, this signal triggers the mono-stable timing circuit, which includes the NAND gate and the inverter NOT5, and causes the inverter NOT5 to output a high level signal to close the electronic simulation switch K1. When the test button 7 is released, the high level signal from pin 5 of the leakage current detection chip IC1 disappears. At this time, the output from the inverter NOT2 changes to a low level signal and the electronic simulation switch K2 automatically closes.

In the event that the GFCI has come to the end of its service life and can no longer provide protection against any electrical current leakage, two things may happen. First, pin 5 of the leakage current detection chip IC1 will not output a high level signal to pin 2 of the end-of-life detection chip IC2. Output from the inverters NOT2, NOT5 of the end-of-life detection chip IC2 is also at a low level. The electronic simulation switch K1 is in an open state and the electronic simulation switch K2 is in a closed state. Pin 8 of the end-of-life detection chip IC2 remains at a low level. The silicon controlled rectifier in the reset/trip circuit is not conductive, no electric current passes through the solenoid coil 26, and no electromagnetic field is generated. The GFCI may not generate a "clatter" sound. The tripper 28 and the locking member 30 of the GFCI are not activated and the reset button 8 cannot be reset. The second possibility is: pin 5 of the leakage current detection chip IC1 continues to output a high level signal, so that the negative D7 pole becomes a high level signal. The electronic simulation switch K2 remains in an open state, so that the silicon controlled rectifier in the reset/trip circuit cannot be triggered to become conductive. No electric current passes through the solenoid coil 26 and no electro-magnetic field is generated. The reset button 8 cannot be reset, and the user should be reminded to replace GFCI with a new GFCI.

By first pressing the test button 7 during use, the end-of-life detection chip IC2 and the leakage current detection chip IC1 detect whether the GFCI can still provide protection against a current leakage or whether the GFCI has come to the end of its service life. If the GFCI is fully functional, the user may hear a "clatter" sound. When the user presses the reset button 8 to reset, the GFCI's load output ends and the power output sockets 5, 6 on the surface of the GFCI have power output. On the other hand, if the GFCI has come to the end of its service life, the end-of-life detection chip IC2 does not output a control signal, so that the silicon controlled rectifier in the reset/trip circuit cannot be triggered to become conductive. No electric current passes through the solenoid coil 26 and no electromagnetic field is generated, so that the tripper 28 and the locking member 30 of the GFCI are not activated, thus preventing the reset button 8 from being reset. As a result, the GFCI's load output ends and the power output sockets 5, 6 are not supplied power. During use, a user may press the test button 7 to test the GFCI. If the user does not hear a "clatter" sound and the reset button 8 cannot be reset, the user knows that it is time to replace the GFCI with a new GFCI.

Figure 5D:
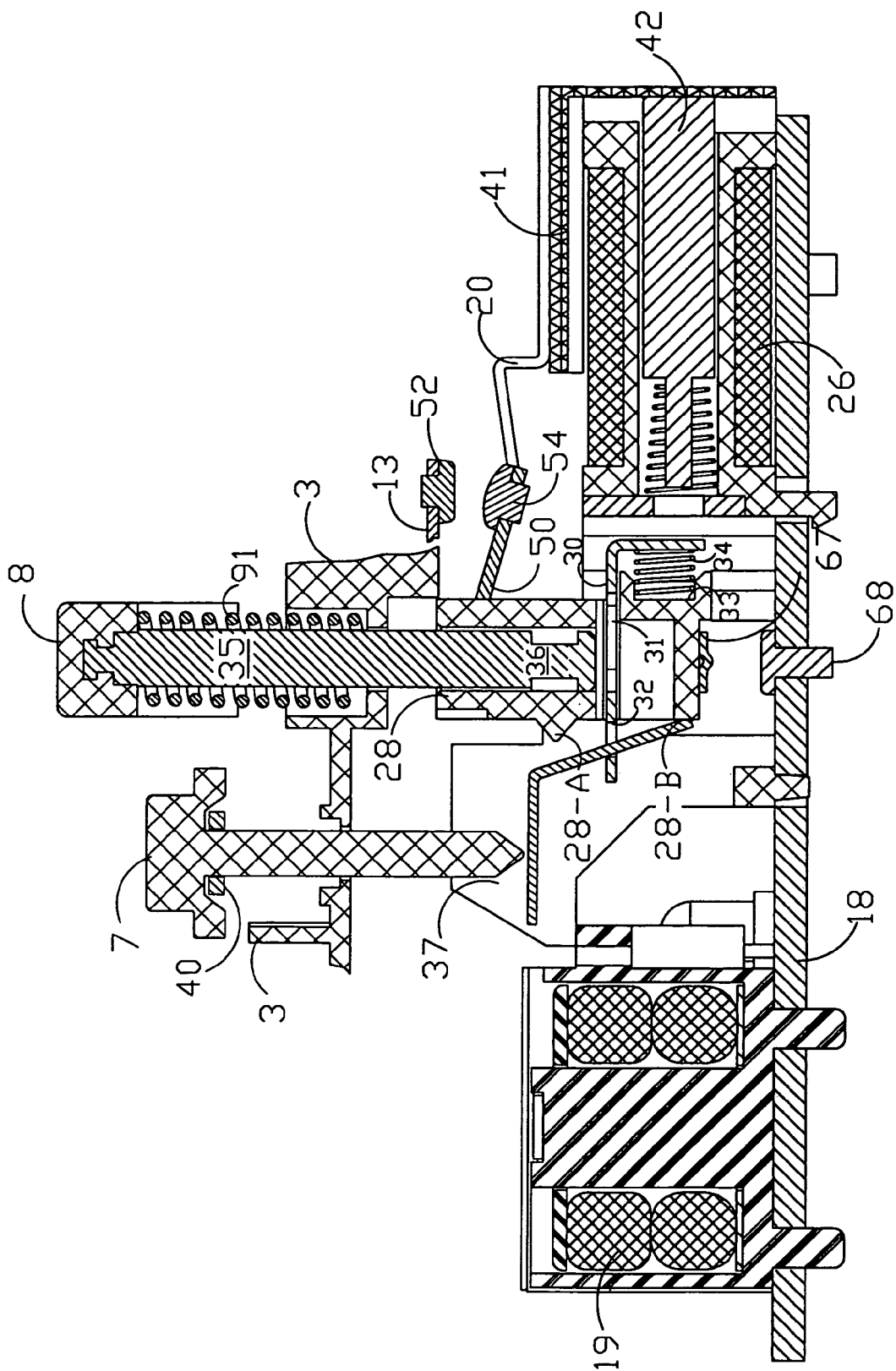
FIG. 5D is a partial cross-sectional view along the C-C line in FIG. 3, illustrating the GFCI being forcibly tripped after the test button is depressed.

As shown in FIG. 5D, the user may mechanically and forcibly cut off power output of the GFCI by pressing the test button 7. The test button 7 has a tail end which penetrates through the insulated mid-level support 3, which touches upon the end of the tripping lever 37. When the service life of the GFCI has ended and the reset button 8 cannot be tripped by using a simulated leakage current, the user can further press down the test button 7 to forcibly trip the GFCI. Pressing the test button 7 pushes the tail end of the test button 7 against the top of the tripping lever 37, which revolves around a pivot point 28-B. The side wall of the tripping lever 37 leaves a pivot point 28-A on the side wall of the tripper 28. Since the tripping lever 37 penetrates through the hole 32 of the locking member 30, the tripping lever 37 pulls the locking member 30 and moves it with the tripping lever 37, causing the circular recessed locking slot 36 at the bottom of the reset directional lock 35 to jump out of the through hole 31 of the locking member 30. The tripper 28 falls, and the flexible power input metal pieces 50, 51 fall as well. The movable contacts on the flexible power input metal pieces 50, 51 are disconnected from the fixed contacts on the power output conductors 13, 14. As a result, power output conductors 13, 14 are not supplied power. The flexible output metal pieces 20, 21 connected to the power output terminals 80, 81 are not supplied power, either. Since neither the power output conductors 13, 14 nor the power output terminals 80, 81 are supplied power, no power is output to the load terminals, i.e., the power output terminals 80, 81 of the GFCI, or to the tri-pronged user accessible power output sockets 5, 6 on the face of the GFCI front lid 2.

The embodiments of the exemplary GFCI described above provide protection against any electrical current leakage. Additionally, when the exemplary GFCI is connected to the hot and neutral wires inside the wall, a user may first press the test button 7 to detect if the GFCI has come to the end of its service life. Specifically, if the GFCI is fully functional and can still provide protection against any electrical current leakage, a "clatter" can be heard, and the reset button 8 can be reset normally. On the other hand, if the GFCI has come to the end of its service life, the end-of-life detection chip IC2 may prevent the reset button 8 from being reset normally. In addition, when a certain part or accessory inside the GFCI fails during use, especially when the solenoid coil 26 fails to work in a normal manner, the test button 7 may be pressed to forcibly cut off the power output of the GFCI using mechanical means. The exemplary GFCI can be widely applied, is safe and easy to use, thus effectively ensuring the personal safety of the user as well as the safety of appliances.

While the GFCI that provides an end of life test and a test result prompt has been described in connection with an exemplary embodiment, those skilled in the art will understand that many modifications in light of these teachings are possible, and this application is intended to cover variations thereof. Therefore, the scope of the appended claims should be accorded the broadest interpretation so as to encompass all such modifications.

What is claimed is:

1. A circuit interrupting device comprising:
a test button;
a series of circuits comprising:
  a main control circuit;
  an end-of-life detection circuit; and
  a reset/trip circuit; and
a reset button;
wherein when said circuit interrupting device is properly wired with power on and at a tripped state, a depression of said test button generates a simulated fault which is detected by said main control circuit;
wherein when components in said main control circuit work properly, a control signal is generated by said main control circuit and transmitted to said end-of-life detection circuit to activate said reset/trip circuit and generated an indication signal; whereby after said indication signal is displayed, said reset button is able to be depressed to reestablish an electrical continuity of said circuit interrupting device; and
wherein when said components in said series of circuits do not work properly, said depression of said test button does not allow said fault signal to be generated and passed through said series of circuit which results in no production of said indication signal; whereby said reset button is not able to be depressed and no electrical continuity is reestablished.

2. The circuit interrupting device according claim 1, wherein said main control circuit comprises a differential transformer and a leakage current detection chip (IC1); and wherein said main control circuit is capable of detecting a fault.

3. The circuit interrupting device according to claim 1, wherein said end-of-life detection circuit comprises an end-of-life detection chip (IC2).

4. The circuit interrupting device according to claim 1, wherein said reset/trip circuit comprises a silicon controlled rectifier (SCR), and a solenoid coil with an iron core inside said solenoid coil.

5. The circuit interrupting device according to claim 1, wherein said indication signal is a sound.

6. The circuit interrupting device according to claim 1, wherein a metal piece is located underneath said test button, and a conductive pin is situated below said metal piece; wherein said conductive pin is embedded in a conductive spring, which is adapted to electrically connected to one of a pair of power input terminals; and wherein said metal piece is adapted to electrically connected to another one of said pair of power input terminals.

7. The circuit interrupting device according to claim 6, wherein when said test button is depressed, said metal piece is in contact with said conductive pin, which generates said simulated fault when said circuit interrupting device is properly wired.

8. The circuit interrupting device according to claim 7, wherein said simulated fault is generated through the use of a resistor, which is located at an electrical path between said conductive spring and said one of said pair of input terminals.

9. The circuit interrupting device according to claim 1, wherein when said circuit interrupting device is not at said tripped state, said depression of said test button mechanically breaks said electrical continuity of said circuit interrupting device.

10. The circuit interrupting device according to claim 2, wherein said IC1 is an RV4145 chip.

11. The circuit interrupting device according to claim 3, wherein said end of life detection circuit further comprises a flexible switch (K3);
wherein said K3 has a first conductive piece and a second conductive piece; wherein said first conductive piece of said K3 is adapted to be coupled to said reset button and said second conductive piece of said K3 is adapted to be connected to a printed circuit board.

12. The circuit interrupting device according to claim 11, wherein said first conductive piece of said K3 is adapted to electrically connect to a power input source; and wherein said second conductive piece of said K3 is adapted to electrically connected to a first input end of said IC2.

13. The circuit interrupting device according to claim 12, wherein said end of life detection circuit further comprises a triode or transistor (Q1) which is at an electrical path between an output end of said IC2 and said SCR.

14. The circuit interrupting device according to claim 13, wherein said IC2 comprises a first simulation switch (K1) and a second simulation switch (K2); wherein said K1 and said K2 are operatively connected to said first input end of said IC2, whereby when said K3 is closed, said K1 and K2 are closed to allow a reset signal to be transmitted to said Q1.

15. The circuit interrupting device according to claim 14, wherein said IC2 further comprises a plurality of inverters and a NAND gate.

16. The circuit interrupting device according to claim 15, wherein said IC2 further comprises a second input end which is adapted to connect to said main control circuit and to receive said control signal; wherein said second input end is operatively connected to said plurality of inverters and said NAND gate to control open/close of said K1 and/or said K2; whereby when said control signal is received, said open/close of said K1 and/or said K2 outputs said control signal to said reset/trip circuit to activate said reset/trip circuit and generate said indication signal.

17. The circuit interrupting device according to claim 16, wherein said IC2 further comprises a time delay circuit capable of configuring a time frame to control said open/close of said K1 and/or said K2.

18. The circuit interrupting device according to claim 16, wherein said IC2 further comprises a third input end which receives a common collector voltage (Vcc) from a power input source; wherein Vcc is generated after an alternating current (AC) from said power input source passes through a diode bridge (D1-D4) to be converted to a direct current (DC), and further passes through a resistor, a diode, and a capacity to be converted to said Vcc.

19. The circuit interrupting device according to claim 1, wherein said circuit interrupting device is a ground fault circuit interrupter, an arc fault circuit interrupter, an immersion detection circuit interrupter, an appliance leakage circuit interrupter, or a circuit breaker.

20. The circuit interrupting device according to claim 1, wherein said ground fault circuit interrupter comprises:
a housing;
a tripping device positioned in a base of said housing;
a printed circuit board positioned in said base of said housing; said printed circuit board comprising:
a first pair of flexible metal pieces having a first end and a second end; wherein said first pair of flexible metal pieces is operationally connected to power source input terminals; said first end of each of said first pair of flexible metal pieces passing through a differential transformer being operationally connected to a hot input line or a neutral input line; said second end of each of said first pair of flexible metal pieces having a movable contact;
a second pair of flexible metal pieces having a first end and a second end; wherein said first end of each of said second pair of flexible metal pieces is operationally connected to a hot power output terminal or a neutral power output terminal; said second end of each of said second pair of flexible metal pieces having a movable contact point;
a pair of output conductors positioned in an insulated middle support; wherein each of said output conductors contains a pair of fixed contacts; and
wherein said movable contact of each of said first pair of flexible metal pieces and said movable contact of each of said second pair of flexible metal pieces are capable of connecting/disconnecting to each of said fixed contacts on said pair of output conductors.

21. A method for testing a circuit interrupting device according to claim 1, comprising:
when said circuit interrupting device is powered and at said tripped state, depressing said test button on said circuit interrupting device;
if said indicating signal is displayed, depressing said reset button to reset said circuit interrupting device; whereby said display of said indication signal indicates that components of said circuit interrupting device work properly.

22. The method of claim 21, wherein if said circuit interrupting device is not at said tripped state, forcibly depressing said test button to mechanically trip said circuit interrupting device.

23. The method according to claim 21, wherein said indicating signal is a sound.

24. The method according to claim 21, wherein if said indicating signal is not displayed, replacing said circuit interrupting device with a new one.

25. The method according to claim 21, wherein said circuit interrupting device is a ground fault circuit interrupter.

26. An end-of-life detection chip (IC2) in an end-of-life detection circuit of a circuit interrupting device comprising:
a plurality of pins;
a first simulation switch (K1) and a second simulation switch (K2);
a plurality of inverters; and
a NAND gate;
wherein said plurality of pins comprise a first pin receiving a control signal from a main control circuit when said main control circuit detects a fault and components of said main control circuit works properly; a second pin receiving a reset signal when a reset button is depressed; and a third pin outputting said control signal and/or said reset signal to a reset/trip circuit;
wherein said first pin is operatively connected to said plurality of inverters and said NAND gate to control open/close of said K1 and/or said K2; whereby when said control signal is received by said first pin, said open/close of said K1 and/or said K2 outputs said control signal via said third pin to said reset/trip circuit to activate said reset/trip circuit and generate an indication signal;

wherein said K1 and said K2 are further operatively connected to said second pin; whereby when said reset signal is received by said second pin, said K1 and said K2 are closed, which allows said reset signal to be output via said third pin to said reset/trip circuit to reestablish an electrical continuity of said circuit interrupting device.

27. The IC2 according to claim 26, wherein said control signal is sent from an output end of a leakage current detection chip (IC1) in said main control circuit to said first pin of said IC2.

28. The IC2 according to claim 26, wherein said second pin of said IC2 is electrically connected to a flexible switch (K3) in said end-of-life detection circuit; wherein said K3 has a first conductive piece and a second conductive piece; wherein said first conductive piece of said K3 is adapted to be coupled to said reset button and said second conductive piece of said K3 is adapted to be connected to a printed circuit board; wherein said first conductive piece of said K3 is adapted to electrically connect to a power input source; and wherein said second conductive piece of said K3 is adapted to electrically connected to said second pin of said IC2.

29. The IC2 according to claim 26, wherein said third pin of said IC2 is electrically connected to a first end of a triode/transistor (Q1); wherein a second end of said Q1 is adapted to be electrically connected to said reset/trip circuit; whereby when said IC2 receives said control signal from said first pin or said reset signal from said second pin, said control signal or said reset signal is output via said third pin to said Q1, and to said reset/trip circuit.

* * * * *